(12) United States Patent
Joung et al.

(10) Patent No.: US 8,012,649 B2
(45) Date of Patent: Sep. 6, 2011

(54) FUEL CELL SYSTEM HAVING PRESSURIZING SYSTEM

(75) Inventors: Young-soo Joung, Yongin-si (KR);
Hye-Jung Cho, Yongin-si (KR);
Jae-yong Lee, Yongin-si (KR);
Young-Jae Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1014 days.

(21) Appl. No.: 11/854,748

(22) Filed: Sep. 13, 2007

(65) Prior Publication Data

US 2008/0096058 A1    Apr. 24, 2008

(30) Foreign Application Priority Data

Oct. 18, 2006   (KR) .................. 10-2006-0101568

(51) Int. Cl.
*H01M 2/10* (2006.01)
*H01M 8/04* (2006.01)
*H01M 2/08* (2006.01)
*H01M 2/14* (2006.01)

(52) U.S. Cl. .......... 429/515; 429/96; 429/100; 429/507; 429/508; 429/512

(58) Field of Classification Search ............ 429/96, 429/100, 400, 515, 507, 508, 512
See application file for complete search history.

(56) References Cited

U.S. PATENT DOCUMENTS

| 7,074,511 | B2 | 7/2006 | Becerra et al. |
| 7,625,655 | B1 | 12/2009 | Becerra et al. |
| 2004/0081884 | A1* | 4/2004 | Bean et al. ............... 429/98 |
| 2006/0172171 | A1 | 8/2006 | Deinzer et al. |
| 2007/0178350 | A1 | 8/2007 | Hasegawa et al. |
| 2009/0208813 | A1 | 8/2009 | Hasebe et al. |

FOREIGN PATENT DOCUMENTS

| CN | 1650457 A | 8/2005 |
| JP | 2005-332685 | 12/2005 |
| JP | 2006-269166 A | 10/2006 |
| JP | 2007-066618 A | 3/2007 |
| KR | 10 2006-0135140 A | 12/2006 |
| KR | 10-0706969 B1 | 4/2007 |
| WO | WO 03/061047 | 7/2003 |
| WO | WO 2005/081346 | 9/2005 |

OTHER PUBLICATIONS

Office Action issued by Chinese Intellectual Property Office in Chinese Patent Application No. 2007100961668 on Mar. 2, 2009.
Chinese Office Action dated Dec. 18, 2009 in CN 2007100961668 (Joung, et al.) with English translation.

* cited by examiner

*Primary Examiner* — Patrick Ryan
*Assistant Examiner* — Julian Mercado
(74) *Attorney, Agent, or Firm* — Lee & Morse, P.C.

(57) ABSTRACT

A fuel cell system having a fuel pressurizing system. The fuel cell system includes: a cartridge comprising a fuel storage pack; a main body; and a pressurizing unit disposed in the main body to pressurize the fuel storage pack when the cartridge is mated to the main body. The cartridge further includes a pressurizing plate to transmit pressure received from the pressurizing unit to the fuel storage pack when the cartridge is mated to the main body and to preventing the fuel storage pack from being pressurized when the cartridge is separated from the main body. The main body can include a case on which the fuel storage pack and the pressurizing plate are received.

22 Claims, 9 Drawing Sheets

FUEL CELL SYSTEM HAVING PRESSURIZING SYSTEM

CROSS-REFERENCE TO RELATED APPLICATIONS

This application claims the benefit of Korean Application No. 2006-101568, filed Oct. 18, 2006, in the Korean Intellectual Property Office, the disclosure of which is incorporated herein by reference.

BACKGROUND OF THE INVENTION

1. Field of the Invention

Aspects of the present invention relate to a fuel cell system and in particular, to a fuel cell system having a fuel pressurizing system.

2. Description of the Related Art

Fuel cell systems include a main body where electricity is generated, and a cartridge to supply fuel to the main body. Hence, fuel supplies to the fuel cell systems can by renewed by replacing a used cartridge with a fresh cartridge.

In order to effectively apply fuel cell systems to mobile systems, such as mobile phones, a fuel cell system should be small and light, a cartridge should have a high fuel storing volume to size ratio, a stable fuel supply should be ensured, the leakage of fuel should be prevented regardless of whether the cartridge is used, and a fuel leakage from the cartridge should be prevented when the user operates the fuel cell system. Above all, the cost of a disposable cartridge should be low, and the fuel cell system should be reliable in operation.

The fuel supplying systems of the conventional fuel cell systems are classified into pressurizing systems and non-pressurizing systems.

Conventional pressurizing fuel cell systems include a pressurizing system disposed in a cartridge and a pressurizing system in a fuel storage pack. Accordingly, the fuel storing volume ratio of the cartridge is reduced, the risk of fuel leakage from the cartridge is increased, and the cost of the cartridge is increased.

Conventional non-pressurizing fuel cell systems do not include a pressurizing system in a cartridge, but include a separate fuel supply mechanism, e.g., a fuel pump, disposed in a main body adapted to supply the fuel to the main body. The disadvantage of this conventional system is that the extra fuel supply mechanism is expensive, the overall volume and cost thereof is increased, and the risk of a failure in the fuel supply mechanism is increased.

As a result, conventional fuel cell systems do not satisfy the above-described conditions for acting as power sources of mobile systems.

SUMMARY OF THE INVENTION

Aspects of the present invention provide a fuel cell system having a pressurizing system with components in both a cartridge and a fuel cell main body. The fuel cell system can increase the fuel storing volume of the cartridge, reduce the cost of the cartridge, reduce the risk of fuel leakage, and reduce the overall size of the fuel cell system.

According to an aspect of the present invention, there is provided a fuel cell system comprising: a cartridge comprising a fuel storage pack; a main body including a fuel cell supplied with fuel from the cartridge; and a pressurizing unit disposed in the main body to pressurize the fuel storage pack when the cartridge is mated to the main body. The pressurizing unit may be a biasing device such as a spring.

The cartridge may further comprise: a pressurizing plate to transmit pressure from the pressurizing unit to the fuel storage pack when the cartridge is mated with the main body. The pressurizing plate can prevent the fuel storage pack from being pressurized when the cartridge is separated from the main body. The present teachings can further comprise a case on which the fuel storage pack and the pressurizing plate are received.

The fuel storage pack may be disposed between the pressurizing plate and the case. A first side of the pressurizing plate may be coupled to a side of the case disposed adjacent to a first side of the pressurizing plate.

The cartridge may further comprise a fixing unit to fix the pressurizing plate when the fuel cell main body and the cartridge are separated from each other.

The fixing unit may be disposed on the case to secure an end of the pressurizing plate, and may have a ratchet portion formed at a surface of the fixing unit that faces the inside of the case, such that the ratchet portion of the fixing unit protrudes toward the inside of the case when the cartridge is not mounted in the main body.

An upper edge of a wall of the case, where the fixing unit is formed, may be bent outwardly. A groove, into which the outwardly bent upper end of the wall of the case is inserted, may be formed on a surface of the fuel cell main body where the cartridge is mounted.

The fuel cell system may further comprise a returning unit to return the pressurizing plate to a fixed state when the cartridge is separated from the main body. The returning unit may be disposed in the cartridge or the main body. The returning unit may be disposed on an end of the pressurizing unit. The returning unit may be a magnetic plate or an adsorption plate. When the returning unit is disposed in the main body, the returning unit may be disposed on an end of the pressurizing unit. The pressurizing unit may include a magnetic plate or an adsorption plate.

A releasing unit, to release the pressurizing plate fixed by the fixing unit when the cartridge is mounted in the fuel cell main body, may be disposed on the surface of the fuel cell main body where the cartridge is mated to the main body. The releasing unit may be a groove formed such that the fixing unit is outwardly pressed when the cartridge is mounted in the fuel cell main body.

Both ends of the pressurizing plate may be fixing units to fix the pressurizing plate when the cartridge is separated from the fuel cell main body. Holes, into which both the ends of the pressurizing plate are inserted, are formed in the case.

Accordingly, since the components of the pressurizing system are disposed in both the cartridge and the fuel cell main body, the fuel storing volume of the cartridge can be increased, and the cost of the cartridge, the risk of fuel leakage, and the overall size of the fuel cell system can be reduced.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
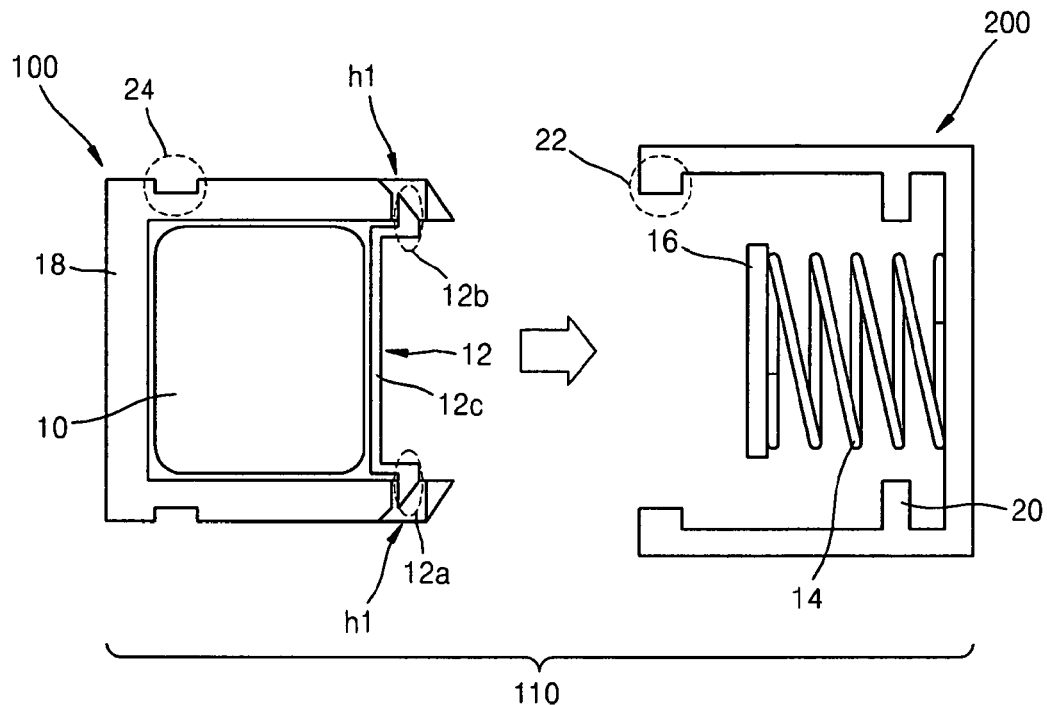
FIGS. 1-3 are cross-sectional views illustrating aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A fuel cell system 110, according to aspects of the present invention, will now be explained with reference to FIGS. 1-3.

FIG. 1 is a cross-sectional view illustrating a cartridge 100 including a fuel storage pack 10 and a main body 200 before the cartridge 100 is mated with the main body 200. FIG. 2 is a cross-sectional view illustrating the cartridge 100 mated with the main body 200. FIG. 3 is a cross-sectional view illustrating the cartridge 100 separated from the main body 200.

Referring to FIG. 1, the fuel cell system 110 includes the cartridge 100 and the main body 200. The main body 200 can include a fuel cell (not shown). The cartridge 100 includes a fuel pack compressing plate 12 that contacts the main body 200 when the cartridge 100 is inserted into the main body 200. The cartridge 100 also includes a fuel storage pack 10. The fuel pack compressing plate 12 is show in a fixed position where the compressing plate 12 prevents external forces from exerting pressure on the fuel storage pack 10. Referring to FIG. 2, the fuel pack compressing plate 12 transmits forces generated by a biasing device 14, in the main body 200. The biasing device 14 can refer to any device that can apply a physical force to an object, for example a coiled spring, a leaf spring, and the like. The forces generated by the biasing device 14 pressurize the fuel storage pack 10, when the cartridge 100 is mated with the main body 200. A returning unit 16 is disposed on a first end of the biasing device 14.

Figure 2:
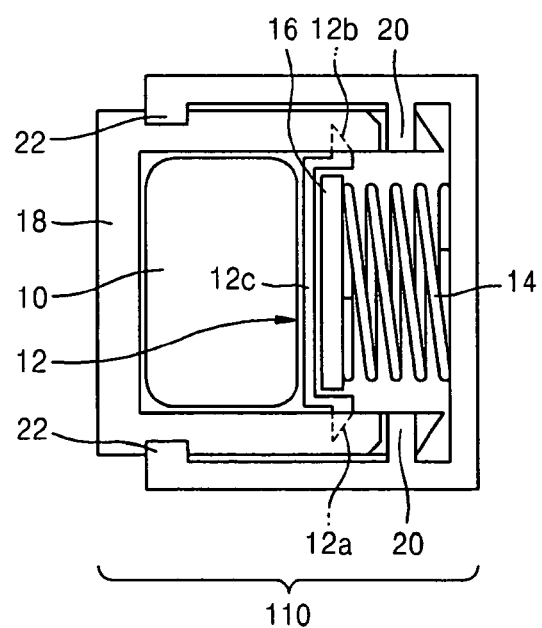
Figure 3:
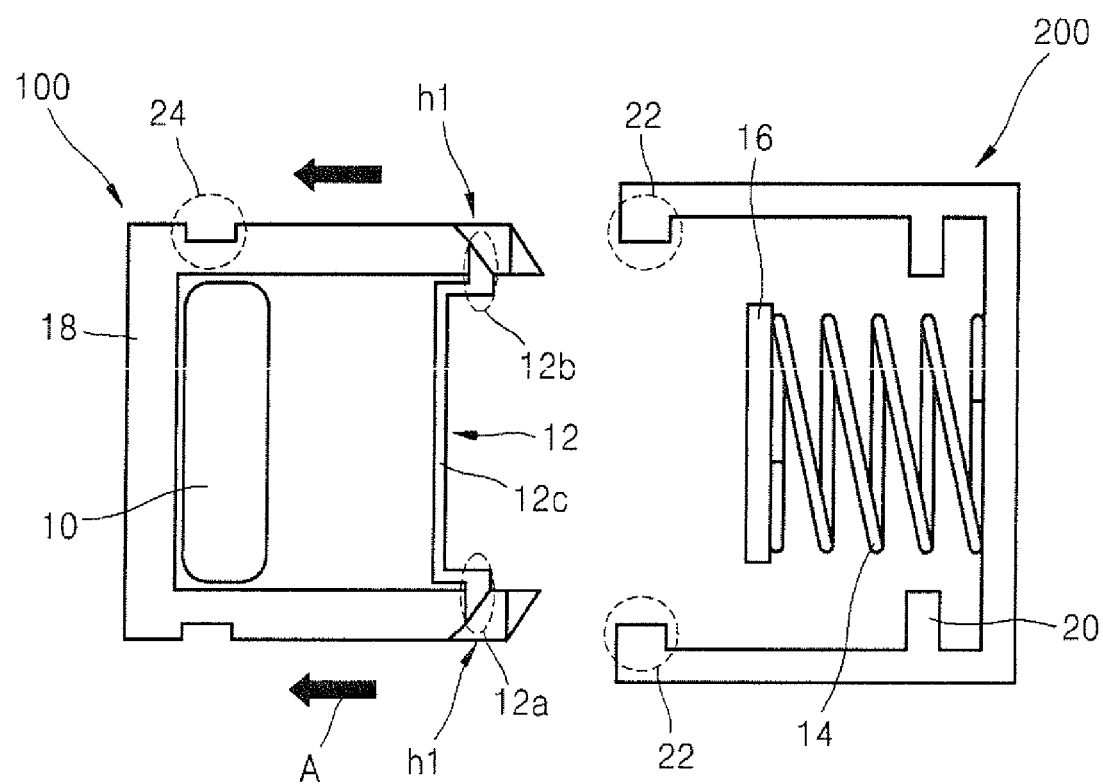

Referring to FIGS. 2 and 3, when the cartridge 100 is shown mounted to, and separated from, the main body 200, respectively. When the cartridge 100 is separated from the main body 200, the returning unit 16 maintains contact with the fuel pack compressing plate 12, and returns the returning unit 16 to a fixed position, as shown in FIG. 1. Accordingly, even when the cartridge 100 is separated from the main body 200, the fuel pack compressing plate 12 can prevent the fuel storage pack 10 from being pressurized by an arbitrary external force. The returning unit 16 may be a magnetic plate or an adsorption plate. When the returning unit 16 is a magnetic plate, the fuel pack compressing plate 12 may be a steel plate, or other magnetically attractable surface.

The cartridge 100 can comprise a case 18 that contains the fuel storage pack 10. The fuel pack compressing plate 12 can comprise ends 12a and 12b, and a rest part 12c. The case 18 can have holes h1, into which both ends 12a and 12b of the fuel pack compressing plate 12 can be inserted. The holes h1 may be formed in opposing walls of the case 18. The ends 12a and 12b of the fuel pack compressing plate 12 are offset from the rest part 12c that is to contact the fuel storage pack 10.

Referring to FIG. 2, when the cartridge 100 is mated with the main body 200, releasing units, for example protrusions 20, formed on inner opposing walls of the main body 200, are inserted into the holes h1 formed in the case 18. As a result, the protrusions 20 push both the ends 12a and 12b, out of the holes h1 and toward the inside of the case 18. Accordingly, the protrusions 20 act to release the fuel pack compressing plate 20 from the holes h1. When both the ends 12a and 12b of the fuel pack compressing plate 12 are forced from the holes h1, the fuel pack compressing plate 12 can pressurize the fuel storage pack 10, by being forced against the fuel storage pack 10 by the biasing device 14.

Referring to FIG. 3, when the cartridge 100 is separated from the main body 200 by being moved in the direction of arrow A, the returning unit 16 pulls the fuel pack compressing plate 12 away from the fuel storage pack 10 until the ends 12a and 12b of the fuel pack compressing plate 12 are reinserted in the holes h1. Further movement of the cartridge 100 away from the main body 200 breaks the coupling force between the returning unit 16 and the fuel pack compressing plate 12, such that the cartridge 100 is separated from the main body 200, and the fuel pack compressing plate 12 is returned to the fixed position.

When the cartridge 100 is coupled to the main body 200, the cartridge 100 is fixed by stoppers 22 of the main body 200. The stoppers 22 may be modified into various shapes as will be described in embodiments to which the present concept is applied. Not only the stoppers 22, but also the other elements may be modified into various shapes as in the embodiments. The cartridge 100 has recesses 24 into which the stoppers 22 are inserted when the cartridge 100 is mated with the main body 200.

Figure 4:
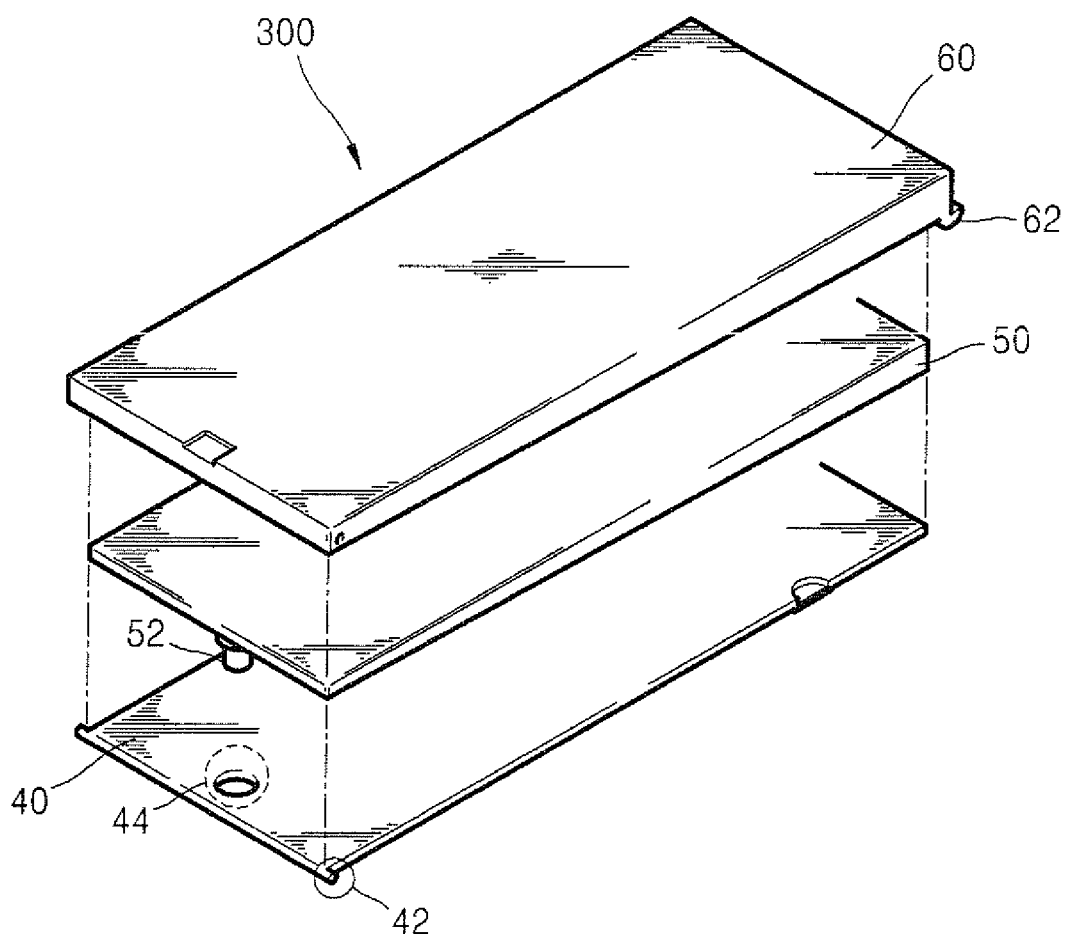
FIG. 4 is an exploded perspective view of a cartridge of a fuel cell system according to an embodiment of the present invention.

FIG. 4 is an exploded perspective view illustrating a cartridge 300 of a fuel cell system, according to an embodiment of the present invention.

Referring to FIG. 4, the cartridge 300 includes a pressurizing plate 40, a fuel storage pack 50, and a case 60 (or a cartridge upper plate). The pressurizing plate 40 has a hole 44 defined therein, through which a connector 52, disposed on the fuel storage pack 50, passes when the fuel storage pack 50 is coupled to the pressurizing plate 40. When the cartridge 300 is coupled to a main body 400 (see FIG. 10), fuel is supplied from the cartridge 300, to a fuel cell 85 included in the main body 400, through the connector 52. Pins 42 outwardly protrude from both sides of an end of the pressurizing plate 40 adjacent to the hole 44.

Figure 5:
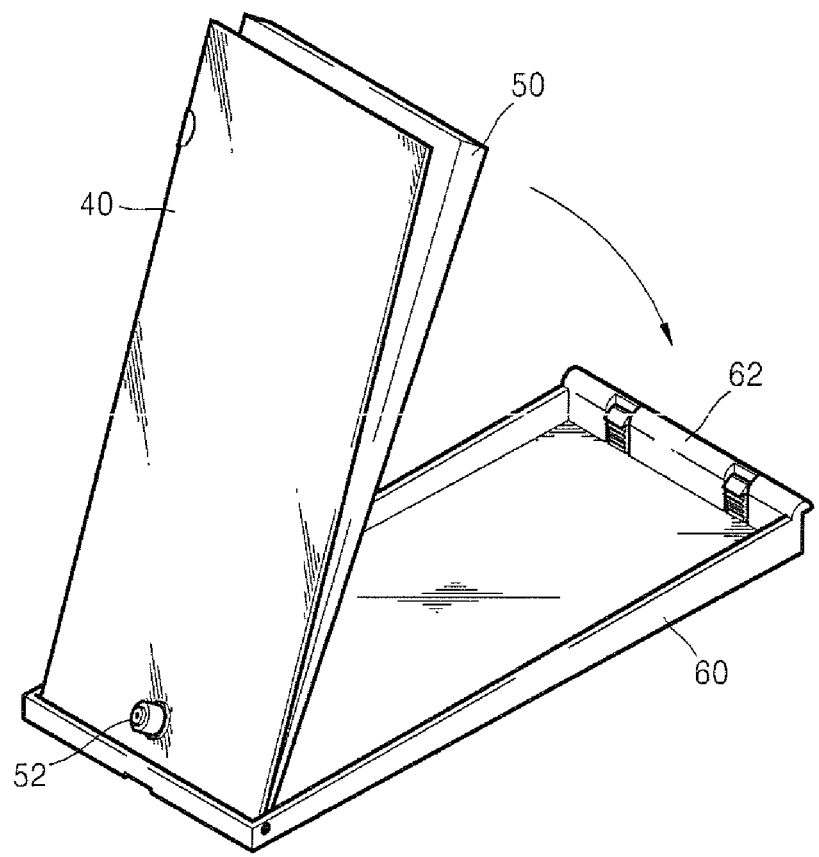
FIGS. 5 and 6 are perspective views illustrating a process of assembling the cartridge of the fuel cell system of FIG. 4.
Figure 6:
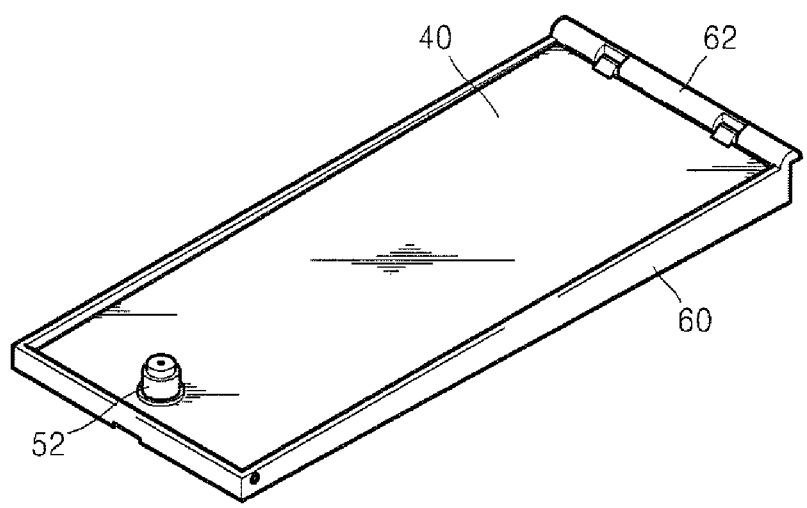

FIGS. 5 and 6 are perspective views illustrating a process of assembling the cartridge 300 of FIG. 4.

Referring to FIGS. 5 and 6, the fuel storage pack 50 and the pressurizing plate 40 are disposed adjacent to the inside of the case 60. The pins 42 of the pressurizing plate 40 are inserted into holes 64 (see FIG. 7) of the case 60. The holes 64 are formed at positions that correspond to the pins 42. In this state, the pressurizing plate 40 can rotate around the pins 42.

Figure 7:
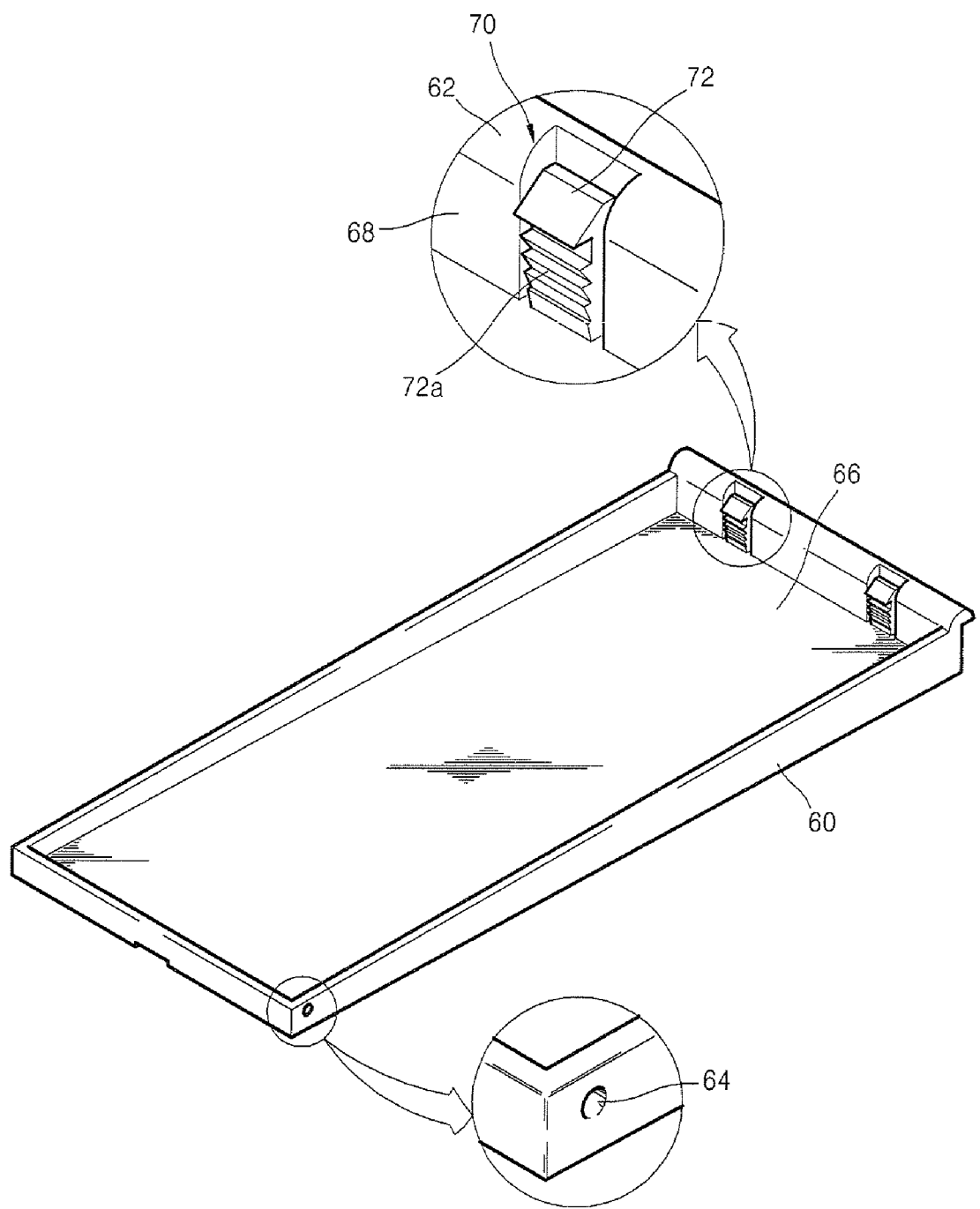
FIG. 7 is a perspective view enlarging several parts of a case of the cartridge of the fuel cell system of FIG. 4.

Referring to FIG. 4 again, a hinge 62 is formed at an edge of the case 60. Referring to FIGS. 5 and 7, the hinge 62 is bent outwardly. The hinge 62 extends along the entire edge of the case 60.

Referring to FIGS. 5 and 7, the inside of the case 60, on which the pressurizing plate 40 and the fuel storage pack 50 are received, has a base portion 66 having a width and a depth large enough to receive the pressurizing plate 40 and the fuel storage pack 50. Grooves 70 are formed in a wall 68 of an end of the case 60 where the hinge 62 is formed. The grooves 70 are formed vertically along an edge of the case 60. Fixing units 72 are disposed in the grooves 70. After the pressurizing plate 40 and the fuel storage pack 50 are completely coupled to the case 60, as shown in FIG. 6, and until the cartridge 300 is coupled to the main body 400 (see FIG. 10), or when the cartridge 300 coupled to the main body 400 is separated from the main body 400, the fixing units 72 prevent the pressurizing plate 40 from being arbitrarily moved by an external force. For example, the fixing units 72 prevent the fuel storage pack 50 from inadvertently being pressurized. To this end, each of the fixing units 72 has a ratchet portion 72a. The ratchet portion 72a is formed at surfaces of the fixing units 72 facing the inside of the case 60. The ratchet portions 72a are shaped such that the pressurizing plate 40 cannot be moved toward the bottom of the case 60 when the fixing units 72 are not bent toward the edge of the case 60. When the cartridge 300 is not mounted in the main body 400, the ratchet portions 72a protrude toward the interior of the case 60. Accordingly, when the cartridge 300 is not mated with in the main body 400, the pressurizing plate 40 is secured by the ratchet portions 72a, and thus, can be prevented from being moved toward the bottom of the case 60. In some embodiments a single fixing unit 72.

Figure 8:
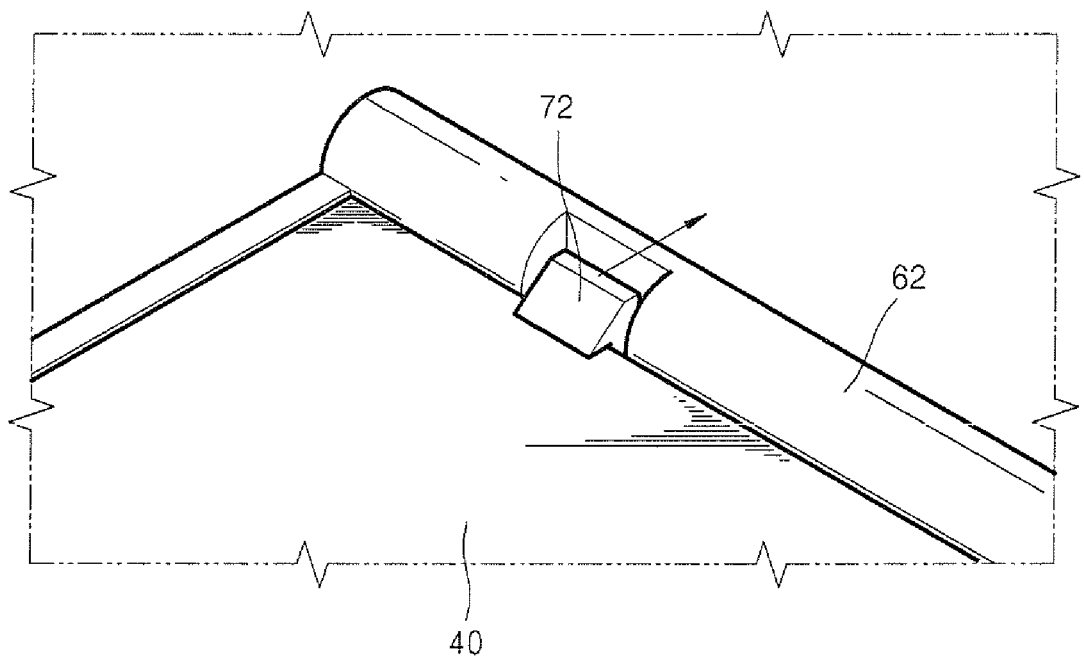
FIG. 8 is a perspective view illustrating a pressurizing plate fixed by a ratchet portion of a fixing unit when the cartridge of the fuel cell system of FIG. 4 is mounted to the main body.
Figure 9:
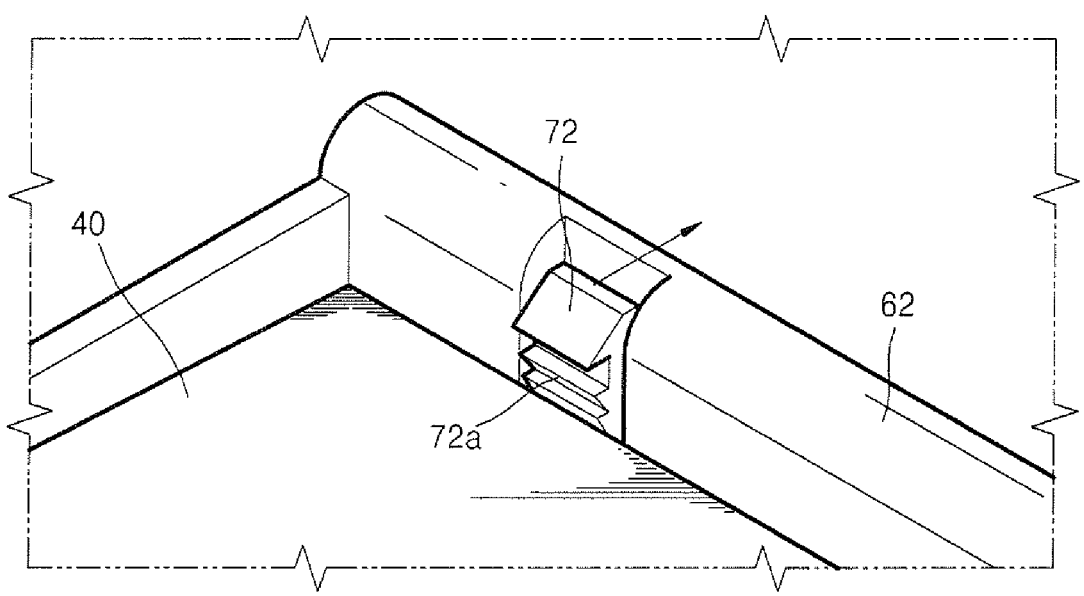
FIG. 9 is a perspective view illustrating the pressurizing plate without the cartridge mounted to the main body of the fuel cell system of FIG. 4.

FIG. 8 is a perspective view illustrating the cartridge 300, when the cartridge is full of fuel. The pressurizing plate 40 is fixed by the ratchet portion 72a of the fixing unit 72. FIG. 9 is a perspective view illustrating the cartridge 300 mated with the main body 400 and separated from the main body 400, respectively. The pressurizing plate 40 is shown fixed by the fixing unit 72. Referring to FIGS. 8 and 9, when the fixing unit 72 is bent in a direction indicated by the arrow, the pressurizing plate 40 may be moved downward by an external force, and thus the fuel storage pack 50 can be pressurized.

Figure 10:
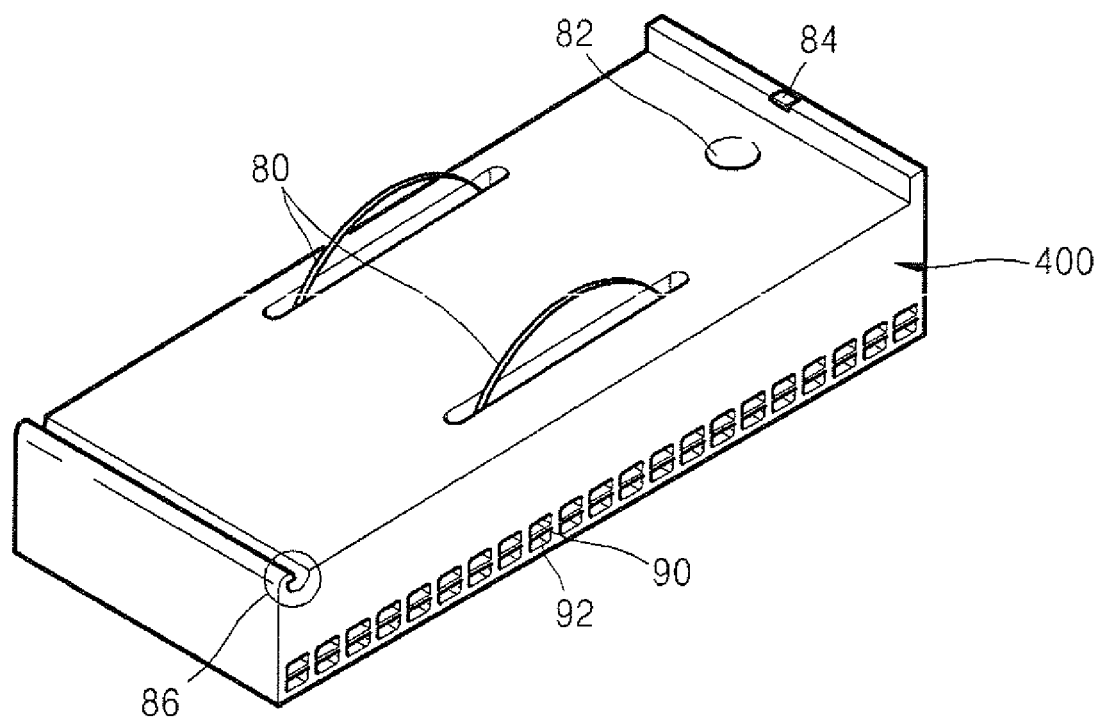
FIG. 10 is a perspective view of the fuel cell main body of the fuel cell system of FIG. 4.

FIG. 10 is a perspective view illustrating the main body 400 of FIG. 4. In FIG. 10, reference numerals 90 and 92 denote air holes of a cathode side of the fuel cell 85 of the main body 400.

Referring to FIG. 10, the fuel cell 85 includes a membrane electrode assembly (MEA) but the main body 400 does not include a conventional fuel pump. Instead of the conventional fuel pump, the main body 400 includes biasing devices 80 formed on a surface of the main body 400 where the cartridge 300 is mated. The biasing devices 80 apply pressure to the pressurizing plate 40 of the cartridge 300. The biasing devices 80 are examples of pressurizing units. Accordingly, pressurizing units other than the springs shown as the biasing devices 80 may be used. A hole 82, into which the connector 52 of the cartridge 300 is inserted, is formed on the surface of the main body 400 where the cartridge 300 is mounted. A fixing hook 84 is disposed to fix the cartridge 300 when the cartridge 300 is mated with the main body 400. The main body 400 includes a groove 86. The groove 86 is formed at a portion of the main body 400 adjacent to the hinge 62 of the case of 60 and extends along the length of the hinge 62. The groove 86 may interact with the hinge 62 of the cartridge 300.

Figure 11:
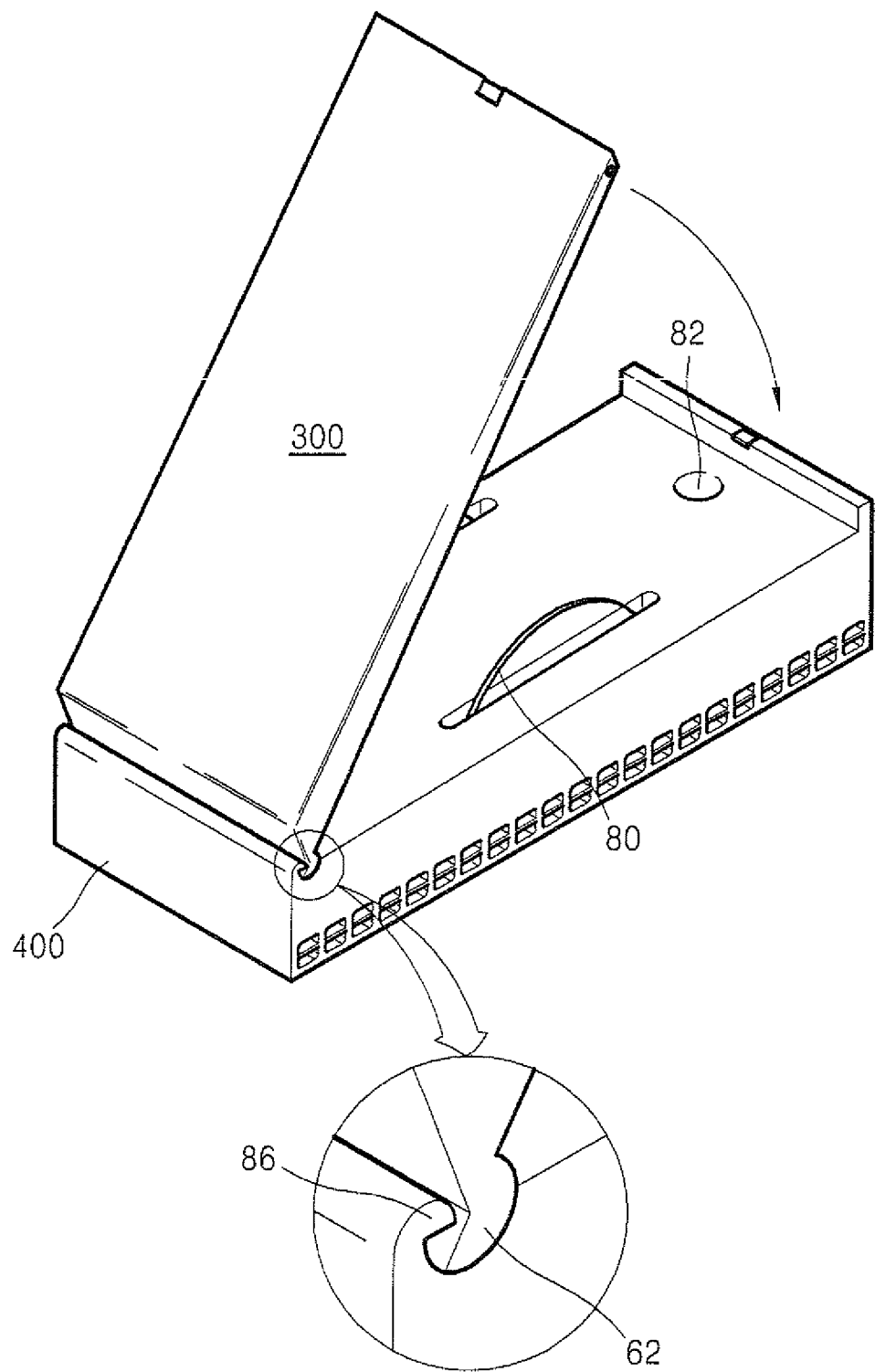
FIG. 11 is a perspective view illustrating a process of coupling the cartridge to the fuel cell main body in the fuel cell system of FIG. 4.
Figure 12:
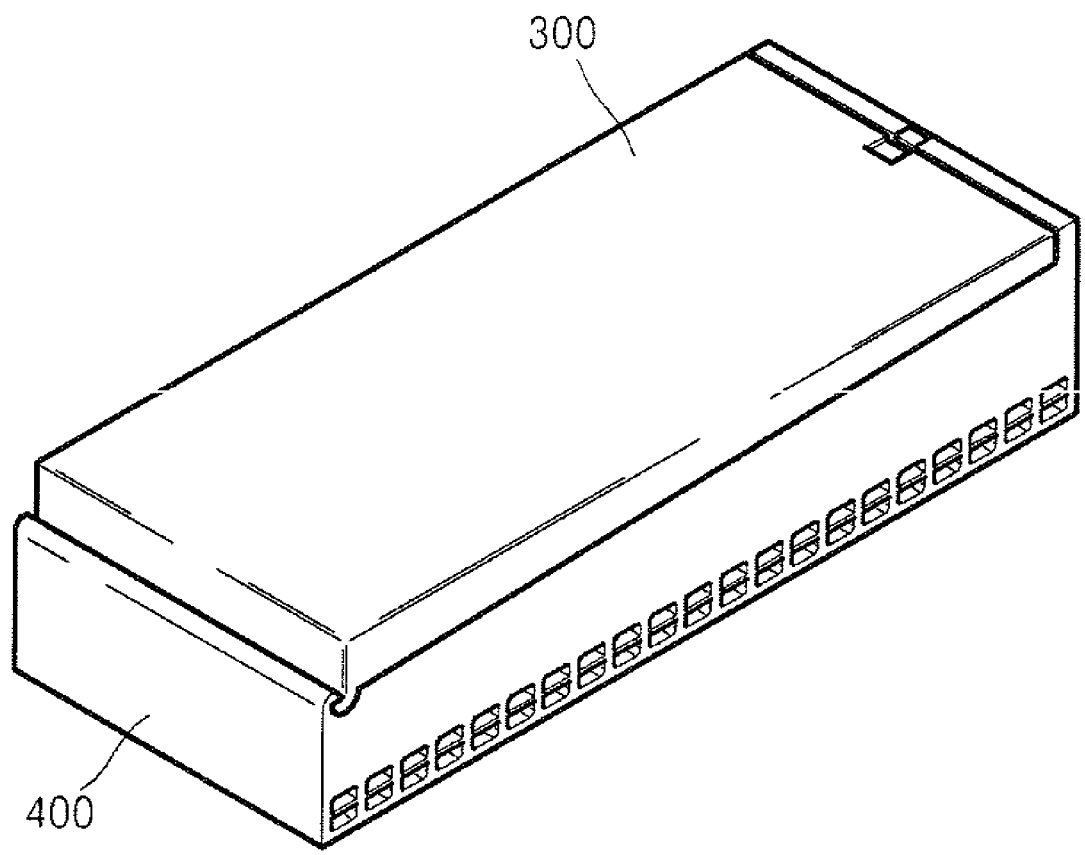
FIG. 12 is a perspective view of the coupled fuel cell system after the process of FIG. 11.

FIG. 11 is a perspective view illustrating a process of mating the cartridge 300 with the main body 400. FIG. 12 is a perspective view illustrating the cartridge 300 mated with the main body 400.

Referring to FIG. 11, when the hinge 62 is inserted into the groove 86 the fixing units 72 are bent in the direction indicated by the arrow of FIG. 8, by a bottom surface of the groove 86, such that the pressurizing plate 40 can be moved against the fuel storage pack 50. The pressurizing plate 40 moves in response to pressures applied by the biasing devices 80. The groove 86 acts as a releasing unit for releasing the pressurizing plate 40 from the fixing units 72.

The biasing devices 80, disposed on the main body 400, act as pressurizing units and may be modified and/or disposed on the cartridge 300. For example, a thin leaf spring may be disposed on a surface of the cartridge 300 to contact the main body 400. The leaf springs may be mounted on the pressurizing plate 40. In this case, a side of the leaf spring is fixed to the pressurizing plate 40, and a sliding switch is located on the other side of the leaf spring. When the sliding switch is pushed toward the fixed side of the leaf spring and then fixed, the leaf spring is bent into an arcuate shape, and can perform the same function as the biasing device 80 disposed on the main body 400.

While the present invention has been particularly shown and described with reference to exemplary embodiments thereof, the embodiments are merely exemplary and should not be construed by those skilled in the art as limiting the scope of the present invention. For example, instead of directly mounting the cartridge in the main body, the cartridge may be inserted into a cartridge holder, and then the cartridge holder may be mated with the main body. A returning unit may be disposed on the cartridge. Accordingly, the spirit and scope of the present invention is not limited by the embodiments, but is defined by the following claims.

As described above, since a cartridge of a fuel cell system, according to aspects of the present invention, does not include a pressurizing unit to pressurize a fuel storage pack in the cartridge, fuel can be prevented from being continuously pressurized and can be prevented from leaking due to careless use.

Since a cartridge of the fuel cell system includes fixing units that fix the pressurizing plate, the pressurizing plate can be moved against the fuel storage pack only when the cartridge is mated with the main body, and can be fixed by the fixing units in other cases. Accordingly, the fuel storage pack can be protected from pressurization resulting from external forces before the cartridge is mated with the main body.

When a cartridge is separated from the main body, the fixing units maintain the position of the pressurizing plate or return the pressurizing plate to a fixed position before the cartridge is mounted in the main body. Thus even when the cartridge mated with the main body, or is separated from the main body, the fuel storage pack can be protected.

Since a pressurizing mechanism is mounted on the main body, it is not necessary to install a pressurizing mechanism on every disposable cartridge, thereby reducing cartridge the manufacturing costs of the cartridge and improving the compatibility of the cartridge.

Since a fuel pump is not used, the risk of failure in the fuel cell system can be reduced, and thus the reliability of the fuel cell system can be improved.

Since a pressurizing mechanism is not disposed in the cartridge, the fuel storing volume of the cartridge can be increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
 a cartridge comprising a fuel storage pack, a pressurizing plate, and a case to house the fuel storage pack and the pressurizing plate;
 a main body, the main body being configured to mate with the cartridge;
 a fixing unit disposed in the cartridge and on a second end of the case, to fix a second end of the pressurizing plate when the main body and the cartridge are separated; and
 a pressurizing unit disposed in the main body to pressurize the fuel storage pack when the main body is mated with the cartridge, wherein:
 the pressurizing plate is configured to transmit a force from the pressurizing unit to the fuel storage pack when the main body is mated with the cartridge, and
 the pressurizing plate is disposed in the case in relationship to the fuel storage pack to protect the fuel storage pack from pressurization when the main body is separated from the cartridge.

2. The fuel cell system of claim 1, wherein, the fuel storage pack is disposed between the pressurizing plate and the case, and a first end of the pressurizing plate is coupled to a first end of the case.

3. The fuel cell system of claim 1, wherein the fixing unit is disposed on the second end of the case and has a ratchet portion to secure the second end of the pressurizing plate.

4. The fuel cell system of claim 1, wherein the case comprises a hinge disposed on the second end thereof.

5. The fuel cell system of claim 4, wherein the main body further comprises a groove disposed on a second end thereof to mate with the hinge.

6. The fuel cell system of claim 1, wherein the pressurizing unit is one of a leaf spring and a coiled spring.

7. The fuel cell system of claim 1, wherein the cartridge further comprises a releasing unit and the releasing unit is configured to release the pressurizing plate from the fixing unit when the cartridge is mated with the main body.

8. The fuel cell system of claim 7, wherein the releasing unit is a groove to press the fixing unit away from the pressurizing plate when the cartridge is mated with the main body.

9. The fuel cell system of claim 1, further comprising a returning unit to return the pressurizing plate to a fixed position when the cartridge is separated from the main body.

10. The fuel cell system of claim 9, wherein the returning unit is disposed upon an end of the pressurizing unit.

11. The fuel cell system of claim 10, wherein the returning unit is a magnet plate or an adsorption plate.

12. The fuel cell system of claim 1, wherein,
 the pressurizing plate has first and second ends,
 the case has first and second holes disposed on an end thereof, and
 the first and second ends of the pressurizing plate are disposed in the first and second holes when the cartridge is separated from the main body such that the pressurizing plate is in a fixed position.

13. The fuel cell system of claim 1, wherein the main body further comprises a fuel cell.

14. The fuel cell system of claim 1, wherein the pressurizing plate has a fuel hole defined therein to deliver a fuel from the fuel storage pack to the main body.

15. A fuel cell system comprising:
 a main body comprising a biasing device disposed therein; and
 a cartridge configured to mate with the main body, the cartridge comprising a fuel storage pack and a pressurizing plate having a fixed position in the cartridge, the pressurizing plate having first and second ends, the cartridge having first and second holes, and the first and second ends of the pressurizing plate being disposed in the first and second holes of the cartridge when the pressurizing plate is in the fixed position,
 wherein the biasing device is configured to move the pressurizing plate against the fuel storage pack to pressurize the fuel storage pack when the cartridge is mated with the main body.

16. The fuel cell system of claim 15, wherein:
 the main body further comprises first and second protrusions to displace the first and second ends of the pressurizing plate from the first and second holes of the cartridge when the cartridge is mated with the main body.

17. The fuel cell system of claim 16, wherein the displacement of the first and second ends allows the biasing device to move the pressurizing plate away from the fixed position.

18. The fuel cell system of claim 15, further comprising a returning unit attached to the biasing device,
 wherein the returning unit is configured to return the pressurizing plate to the fixed position when the cartridge is removed from the main body.

19. The fuel cell system of claim 18, wherein the returning unit is one of a magnet and an adsorption plate.

20. The fuel cell system of claim 15, wherein the biasing device is a spring.

21. The fuel cell system of claim 15, wherein when the pressurizing plate is in the fixed position the pressurizing plate is prevented from contacting the fuel storage pack.

22. A fuel cell system comprising:
 a cartridge comprising a fuel storage pack, a pressurizing plate, and a case to house the fuel storage pack and the pressurizing plate;
 a main body, the main body being configured to mate with the cartridge; and
 a pressurizing unit disposed in the main body to pressurize the fuel storage pack when the main body is mated with the cartridge, wherein:
 the pressurizing plate is configured to transmit a force from the pressurizing unit to the fuel storage pack when the main body is mated with the cartridge,
 the pressurizing plate is disposed in the case in relationship to the fuel storage pack to protect the fuel storage pack from pressurization when the main body is separated from the cartridge, and
 the pressurizing plate has first and second ends, the case has first and second holes disposed on an end thereof, and the first and second ends of the pressurizing plate are disposed in the first and second holes when the cartridge is separated from the main body such that the pressurizing plate is in a fixed position.

* * * * *